July 19, 1938.  G. R. HANKS  2,124,517

DREDGE BUCKET

Filed April 29, 1937

Inventor.

George R. Hanks

By Jac H Richmond

Attorney

Patented July 19, 1938

2,124,517

UNITED STATES PATENT OFFICE 2,124,517

DREDGE BUCKET

George R. Hanks, Clinton, N. J., assignor to Taylor-Wharton Iron & Steel Company, High Bridge, N. J., a corporation of New Jersey Application April 29, 1937, Serial No. 139,819

5 Claims. (Cl. 37—141)

The invention provides certain improvements in the construction and operation of dredge buckets, more particularly dredge bucket and lip assemblies of the rivetless or so-called Stires type, in which the trailing ends of the lip are swingingly mounted in formations of the bucket which ultimately, and after the lip has been swung to its seat, function as end locks which, in conjunction with an intermediate lock, serve to maintain a more or less tight assembly under digging stress.

The improvements are directed in the main toward simplification of the intermediate lock, the inventive thought comprehending locking provisions of durable and positive type and which even in the event of breakage will yet be effective to maintain an operative assembly for the normal life of the lip.

The nature, characteristic features and scope of the invention more readily will be understood from the following description taken in connection with the accompanying drawing forming a part hereof, wherein.

Figure 1:
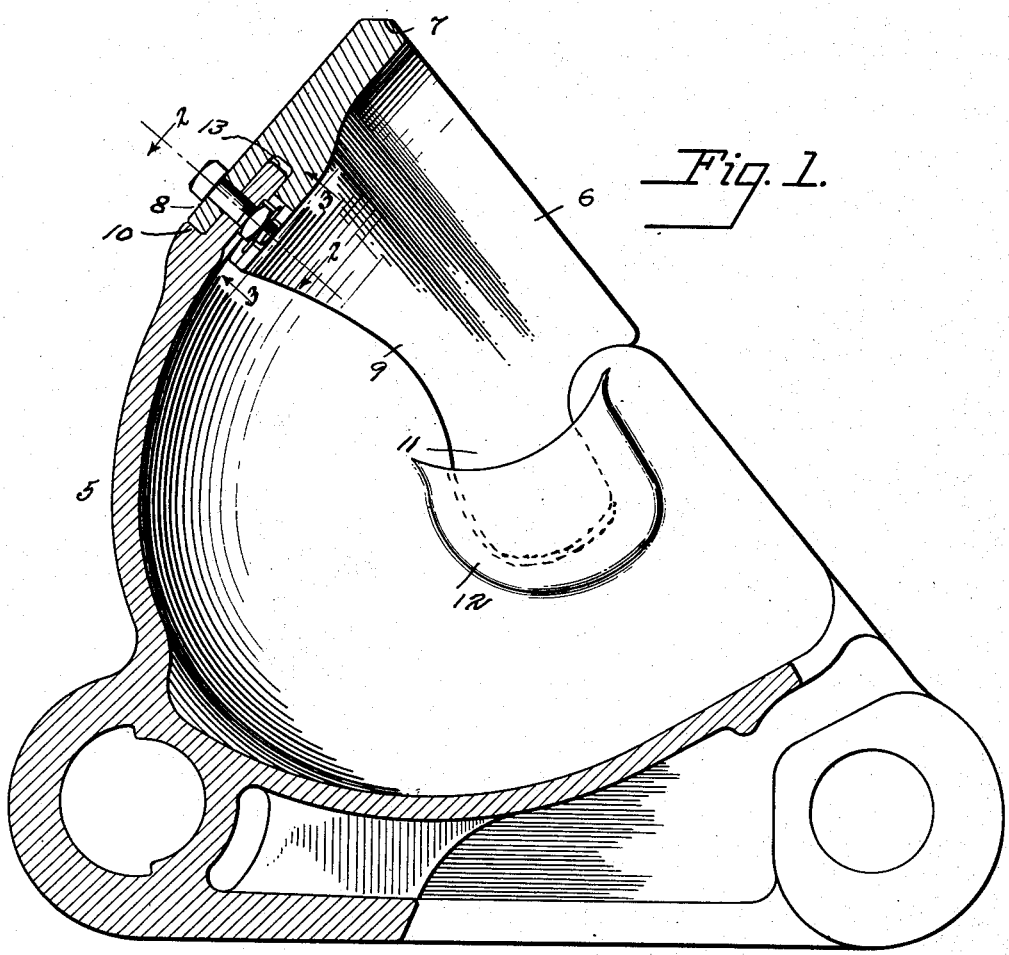
Fig. 1 is a sectional elevational view of the improved dredge bucket and lip assembly.
Figure 2:
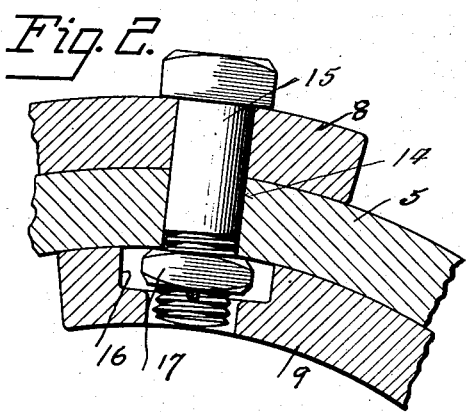
Fig. 2 is a section on line 2—2 of Fig. 1.
Figure 3:
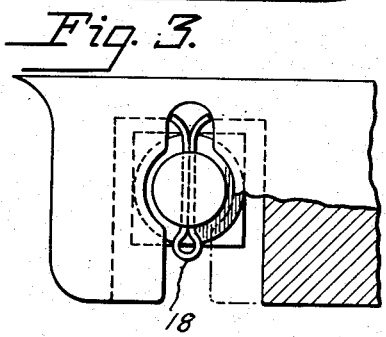
Fig. 3 is a section on line 3—3 of Fig. 1.

The bucket 5, except as hereinafter specified, may be of standard or usual construction; and the rim straddling lip 6 may have any desired form of cutting edge 7.

The lip is formed with outside apron 8 and inside aprons 9. The outside apron 8 may take a bearing upon the abutment 10 of the bucket. The inside aprons or rather their extensions 11 enable the lip to be readily swung to straddling position on the rim of the bucket. During the swinging operation the extensions become substantially lodged in the recessed formations or pockets 12 in the hood of the bucket and are rigidly held thereby. With or without the external abutment 10 it will be understood that the arrangement is such as to afford a rim seat 13 for the lip.

At one or more intermediate points of the assembly there are alined openings in the lip aprons and bucket to provide a passway 14 for the so-called intermediate locking provisions for keeping the lip properly restrained under digging stress. Such locking provisions are of the positive type and fundamentally may be identified as headed bolts or similar fastenings 15. It is a merit of the invention that the arrangement is such that proper safeguards are provided to inhibit loss of the bolt or such displacement thereof as may be calculated to free the lip even under conditions where the head of the bolt or other fastening is completely worn or sheared off. In the advancement of that thought the bolt opening of the inside apron is expanded in a radial direction on the bucket side to provide a slot way or housing 16 for a square nut 17 which cooperates with the bolt. The slot way or housing 16 is of such form as to inhibit full rotation of the nut 17. As a matter of convenience it may be an elongated polygonal slot opening to the clear through the lower edge of the apron. Thus, in establishing the lock the nut would be entered through the edge opening and brought into registration with the bolt which then would be screwed home. The cotter pin 18, when present, is useful as an additional precautionary measure.

Having described my invention, I claim:

1. A dredge bucket, a lip swingingly mounted thereon and having inside and outside aprons, alined openings in the apron and bucket to form a passway for a bolt, and a slot in the inside apron extending through the bottom edge thereof and having recessed shouldered areas to permit a nut to be slid to place for cooperation with the bolt, said shouldered areas inhibiting rotation of the nut.

2. A dredge bucket having a lip seat, a lip swingingly mounted with relation to the seat, and intermediate securing devices comprising bolts engaging the bucket and lapping portions of the lip, one of said lapping portions having a recess on the bucket side to receive a nut, and a nut in said recess engaging the bolt and cooperating with a wall of the recess to prevent casual displacement of the bolt.

3. A dredge bucket having a lip seat, a lip adapted to the seat and having end locks, and intermediate locks comprising bolts penetrating a wall of the bucket and inside and outside lapping portion of the lip, the bolt-way of one of the lapping portions being radially extended to form a housing for means for securing the bolt.

4. A dredge bucket having a lip seat, a lip adapted to the seat and having end locks, and intermediate locks comprising screw bolts penetrating a wall of the bucket and inside and outside lapping portions of the lip, the bolt-way of the inside lapping portion being radially extended to form an inside housing for the complemental nut of the bolt, a wall of the housing inhibiting rotation of the nut.

5. In a dredge bucket and lip assembly in which the lip is swingingly mounted by mutual provisions serving as end locks for the lip, an intermediate lock comprising a bolt penetrating inner and outer lapping portions of the lip and bucket, the inner lapping portion of the lip being slotted inwardly of its bottom edge to accommodate the bolt, and said slotted portion being enlarged on the bucket side of the lip to permit the introduction of a nut, and a nut in said enlarged portion to cooperate with the bolt.

GEORGE R. HANKS.